Figure 1:
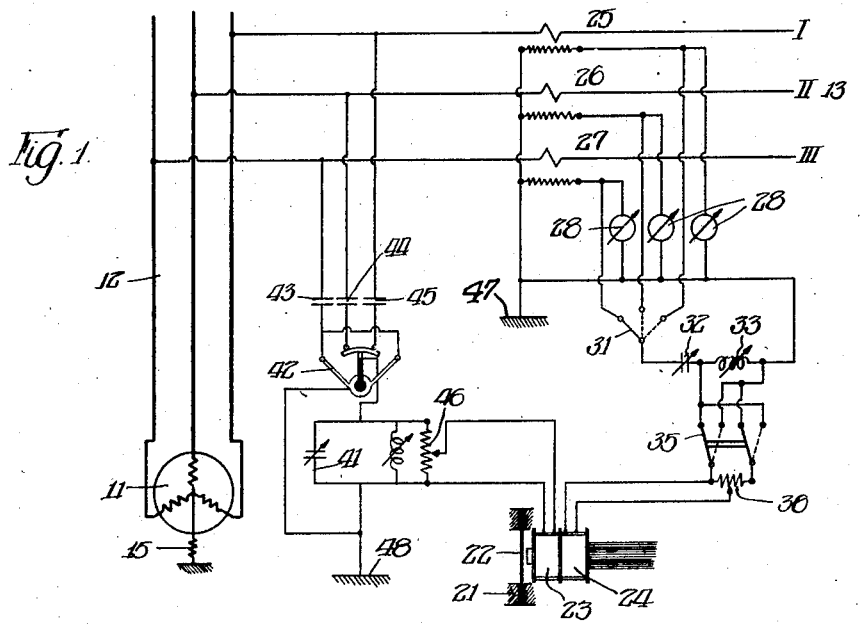

April 1, 1930.  J. KOPELIOWITSCH ET AL  1,752,991

APPARATUS FOR DETECTING GROUNDS

Filed Dec. 3, 1926

Witness:
R. Burkhardt

Inventors:
Jakob Kopeliowitsch,
Josef Stocklin,
By Cromwell, Greist & Warden
Attys Patented Apr. 1, 1930

1,752,991

UNITED STATES PATENT OFFICE

JAKOB KOPELIOWITSCH, OF BADEN, AND JOSEF STOECKLIN, OF ZURICH, SWITZERLAND, ASSIGNORS TO A. G. BROWN BOVERI & CIE., OF BADEN, SWITZERLAND, A JOINT-STOCK COMPANY OF SWITZERLAND

APPARATUS FOR DETECTING GROUNDS

Application filed December 3, 1926, Serial No. 152,331, and in Germany December 11, 1925.

This invention relates to apparatus and methods for detecting grounds and it has particular relation to the detection of grounds in electric power transmission lines, such as is described in the co-pending application Serial No. 80,082, filed January 8, 1926 of J. Jonas. The invention is principally concerned with the detection of grounds on electric power transmission systems provided with neutral grounding choke coils in order to prevent damage occuring by reason of a fault on one of the line phases, such fault being usually accompanied by intermittent arcing commonly known as an arcing ground.

In general, a ground occurring on a phase of a transmission line of the foregoing character will not render the line, or even the faulty phase, inoperative, but the intermittent arcing at the fault may be a source of a very serious danger to the entire transmission line system on account of the high frequency surges that are usually developed by the arcing. In the above-identified application various arrangements and methods are described for locating the faulty phase and also the point where the fault on a particular phase has occurred. Some of the arrangements described in the foregoing application depend on the use of instruments, or other devices, which are operated by the harmonic currents that flow in the faulty feeder or phase. The individual instruments used in the foregoing systems give, however, only quantitative indications of the magnitude of the harmonic currents without indicating the direction of flow thereof, so that in order to locate the point where the fault on a particular feeder occurred a number of instruments placed at wide intervals must be observed simultaneously.

It is among the objects of the present invention to provide improved arrangements and methods for ascertaining not only the existence of a fault on the line, but also for determining on which side of the line the fault lies.

In accordance with the invention, we utilize for determining the faulty phase of the line, not only the higher harmonic currents flowing in the line, but also the higher harmonic voltages existing at the points where the line is being tested for the fault. The voltage and current components of the higher harmonics are combined to actuate a suitable instrument or device, which is thus functioning like a wattmeter, giving indication not only of the magnitude of the fault currents, but also of the direction of flow thereof.

Figure 2:
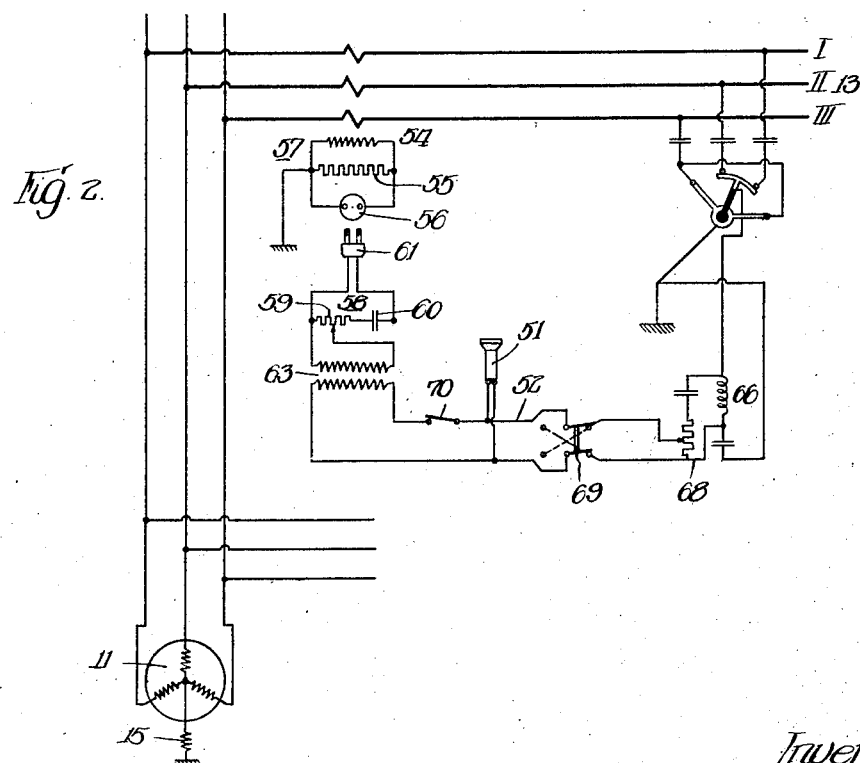

The invention will be best understood from the accompanying drawings in which,

Fig. 1 is a diagram of a power transmission system provided with an arrangement for practicing our invention; and Fig. 2 is a diagram similar to Fig. 1 showing another form of our invention.

Referring to Fig. 1, a power transmission system may comprise a generator 11 supplying a three-phase transmission line 12 comprising the phases I, II, and III. Branching off, from the transmission line system 12, are branch feeder lines 13. In order to eliminate arcing grounds on such systems, a grounding choke coil 15 of suitable dimensions is shown connected to the neutral point of the generator 11.

As pointed out in the above-identified application, on occurrence of a ground on one phase of a feeder the particular phase may be detected by comparing the higher harmonic currents flowing in the individual phases, the harmonic currents in the faulty phase being considerably in excess of such currents flowing in the other phases. Either straight current-measuring devices, such as ammeters, may be used for determining the existence of harmonic currents in any one of the line phases, or suitable frequency meters may be used instead.

The prior art arrangement proved inadequate inasmuch as the instrument used for determining the existence of harmonic currents would give no indication of the direction in which the fault on the line was to be sought. The disadvantage of the prior art arrangements is being overcome by the present invention through the use of instruments or devices which are actuated by the combined effect of the higher harmonics of the line current and the higher harmonics of the line voltage with the result that the instruments give definite indications of the direction where the fault is to be found.

The foregoing broad principles of the invention may be utilized in a variety of ways. For instance, all of the harmonic currents may be brought into cooperation with their respective voltage harmonics, or the desired result may be secured by segregating a particular harmonic of definite frequency and operating the indicating devices, or other instruments, with the current and voltage of the particular harmonic. Suitable resonance circuits or filters may, in such cases, be provided for segregating the harmonic currents and voltages of a particular frequency.

The instrument or device operated in response to the combined action of the harmonic currents and harmonic voltages may comprise, for instance, two coils, one of which is connected to circulate the current harmonics, and the other, the voltage harmonics. The effect produced by the combined action of the current and voltage harmonics flowing in said coils will then depend on the phase angle between the current and the voltage. Since, at the particular point of the line, which is being tested for the fault, the current flowing to said point is 180° out of phase with the current flowing away from said point, it is possible to determine from the responsive indicating action of the instrument from which side of the line the harmonic current flows toward the test point, and toward which side of the line the harmonic current is flowing from said point. In other words, it is thus possible to determine at one particular point of the line on which side thereof the fault lies without the use of instruments at remote points thereof.

In applying the voltage harmonics of the line to an instrument of the foregoing character, suitable voltage transformer devices are utilized either of the inductive or of the capacitative type. The voltage transformers may serve as part of the resonance circuits for filtering out particular harmonics. In particular the condenser type voltage transformers, in the shape of condenser bushings, are very suitable for that purpose, and the capacity between the condenser plates and the ground may be utilized as a part of the capacity of the resonant filter circuits.

While a variety of instruments may be utilized in practicing our invention, we have found that telephone receivers or other audible detecting devices are particularly suitable for our purposes. The telephone receiver is, namely, capable of detecting harmonics both in respect to the intensity of the harmonic currents as well as in respect to the pitch of the tone produced thereby. The instrument constitutes thus in itself a very effective selector of the harmonics.

A very simple arrangement for utilizing the principle of a telephone receiver to operate in response to the combined effect of the current and voltage harmonics may consist in a receiver having two coils, one of which is energized by the current harmonics and the other by the voltage harmonics. The phase relation between the two resulting currents in the coils of the receiver is so chosen or adjusted that the phase angle between the currents in the two coils is different from 90° since only in the latter case will the intensity of the sound produced in the telephone depend upon the direction of the flow of the higher harmonics. The two currents are preferably so arranged as to be either in phase, or 180° out of phase, so that a reversal of current in one of the coils is accompanied by a great difference in the intensity of the sound produced by the telephone.

An arrangement of the foregoing character is shown by way of example in Fig. 1, in which a fault-indicating instrument, in the form of a receiver 21, comprises a diaphragm 22 which is put into vibration by the action of two coils 23, 24 which are energized, respectively, by the current and voltage harmonics of the faulty line phase, as explained above. For supplying the current harmonics to the current coil 24 of the receiver, the feeder line, at the point where it is to be tested, is provided with current transformers 25, 26 and 27, which may also serve the current indicating devices 28 that are utilized to measure the load current flowing in the several lines. Any one of the secondary windings of the individual current transformers may be connected by means of a single-pole change-over switch 31 to a resonance circuit which may comprise a variable condenser 32 and a variable inductance 33 that are tuned to a particular harmonic with which the indicating device 21 is desired to be operated. The selected harmonic currents may be led from the resonance circuit 32 and 33 to the current coil 24 of the indicating devices by means of a double pole change-over switch 35 which is connected to a resistor 36 from which a part of the current may be tapped to the current coil. By adjusting the tap on the resistor 36 the amount of the harmonic current flowing through the coil 24 may be adjusted, while the double pole change-over switch 35 may be utilized to vary the direction of the flow of the current through said coil.

The voltage coil 23 of the indicating device is energized by a voltage harmonic of the same frequency as the current harmonic supplied to the coil 24. To this end a resonance circuit 41 comprising a condenser and an inductance is arranged to be connected by means of a special three-arm change-over switch 42 between any one of the phases of the line and the two others through suitable condensers 43, 44 and 45 connected in series between the contacts of the change-over switch and the three line phases. As shown in the drawing, the center arm of the change-over switch is arranged to make contact with at least two contact members leading to the condensers of two different line phases, while one of the side arms makes contact with the switch terminal leading to the third phase. The middle arm of the special switch 42 is insulated from the two side arms, the middle arm being connected to one terminal of the resonance circuit 41, while the side arms are connected to the other terminal of said circuit. By rotating the three-arm switch 42, the several arms of which are rigidly connected to each other, the resonance circuit 41 may be connected between either one of the line phases and the remaining pair of phases, producing a flow of current through said resonance circuit corresponding to the voltage between the respective phase and the two other phases. Since the resonance circuit 41 is tuned to a particular frequency, only the harmonic currents of said frequency will develop between the terminals of said resonance circuit, and a part of said harmonics may be tapped off through a potentiometer type resistor 46 to the voltage coil 23 of the indicating device 21. The resonance circuit for the current harmonics and the resonance circuit for the voltage harmonics may be grounded, as indicated at 47 and 48.

If the line is in order, and no one of the phases thereof is grounded, the harmonic current and voltage components in the individual phases will be relatively small. If the indicating device 21 were connected with its current coil 24 only through the resonant circuit 32, 33 and the change-over switch 31 to a current transformer of one of the phases of the line 13, the intensity of the harmonic currents flowing into the current coil 24 of the indicating device would, under such conditions, be relatively small, and as a result the telephone receiver would not emit any sound at all, or a faint sound only.

However, if the line phase to which the resonance circuit 32—32 is coupled has a ground, relatively strong harmonic currents will develop in said line phase, and consequently the harmonic currents that are being supplied to the current coil 24 from the resonance circuit 32—33 will be sufficiently strong to develop a loud sound in the telephone device 21. Thus, the excitation of the current coil 24 only of the indicating device 21 will permit, in itself, the determination as to whether one of the line phases is grounded, and on which phase said ground exists, it being merely necessary, for this purpose, to successively connect the individual line phases I, II, III to the resonance circuit by means of the change-over switch 31. As long as the sound produced in the telephone is faint, the respective line is free from fault. If the line has a ground, a loud sound will be emitted by the telephone.

If the current coil 24 alone is used to determine the existence of a fault, it is immaterial which position is occupied by the double pole change-over switch 35 which controls the direction of the flow of the harmonic currents in the current coil 24 of the indicating device, the sound produced by the telephone will be the same whether the switch is in the right hand position, or in the left hand position.

In order to determine on which side of the line the fault has occurred, we utilize the combined effect of the excitation of the current harmonics and the voltage harmonics in the current and voltage coils 24 and 23, respectively, of the indicating device. To this end, the current coil 24 is connected through the change-over switch 31 to the current transformer of the faulty phase, while at the same time the voltage coil 23 of the indicating device is connected through the three-arm change-over swich 42 between the faulty line phase and the two other phases so as to circulate through said voltage coil a harmonic voltage component of the same frequency as the harmonic current component circulated through the current coil 24. Thus, assuming that the fault has been found to lie on the line phase III, then the single pole changeover switch 31 is placed in the full line position, connecting the resonance circuit 32—33 to the current transformer 27 of the faulty phase. Similarly, the three-arm switch 42 is placed in the position shown in the drawing, so that the resonance circuit 41, for supplying the voltage harmonics to the voltage coil 23, is connected between the condenser 43 leading to the faulty phase III and the two condensers 44 and 45 leading to the sound line phases I and II, respectively.

By suitably regulating the constants of the circuits which supply the voltage and current coils 23—24 of the indicating device, and the resistors 46 and 36 which control the magnitudes of the harmonic currents supplied to said coils, it is possible to so adjust the same that the currents in the coils 23 and 24 are practically equal and either assist or oppose one another. The vibration of the diaphragm 22 excited by the currents in said two coils will then give rise to a tone of a certain pitch corresponding to the frequency of the harmonics. Under such conditions, if the currents in the coils 23 and 24 flow in the same direction and exercise a cumulative force on the diaphragm 22 the telephone will produce the loudest sound. A reversal of the position of the double pole change-over switch 35 will then cause the harmonic currents in the current coil 24 of the indicating device to be reversed, producing a very marked reduction in the tone intensity. The same effect could be secured by reversing the connections of the current transformer supplying the harmonic currents from the faulty line.

If a substation through which the line on which a fault has occurred is provided with two such indicating devices, each one being adjusted to produce the maximum sound for a particular direction of flow of the harmonic currents, say in a direction away from the substation, then one of the indicating devices will produce a strong signal, while the other of the indicating devices will produce a weak signal, thus giving definite indication on which side of the line the fault is to be found. Instead of using two indicating devices, a single indicating device, such as shown in Fig. 1, may be used. In such case the device must be suitably calibrated so that an intense sound in the telephone, with the double pole switch 35 in the left hand position indicates the existence of the fault on one side of the line, while an intense sound in the telephone with the position of the change-over switch in the right hand position is an indication of the existence of a fault on the opposite side of the line. There is thus no difficulty in arranging the connections so that the intensity of the sound in the telephone indicates the direction in which the fault on the line lies.

Instead of using a telephone or having two actuating coils independently excited by the current and voltage harmonics, respectively, we may utilize a device with a single actuating coil, and excite the same with a current having a magnitude representing the resultant of the combined effect of the current and voltage harmonics of the faulty line phase. Such an arrangement is shown in Fig. 2 in which a three-phase transmission line system 13, such as shown in Fig. 1, is provided with a ground-indicating device in the form of a single-coil telephone 51, which is excited from an exciting circuit 52 by a current which is proportional to either the sum or the difference of the harmonic voltage and current components in the faulty line phase.

The transmission line 13 is provided with a set of current transformers 54 similar in character to the current transformers in the arrangement shown in Fig. 1. The secondary winding of each current transformer is connected to a load resistor 55 having in parallel thereto a socket 56. One pole of the secondary current transformer winding may be grounded, as at 57.

A harmonic current trap 58 comprising a resistor 59 and a serially-connected condenser 60 may be connected in parallel to the load resistor 55 by means of a plug 61 adapted to be inserted into one of the sockets 56. Assuming that harmonic currents flow in a faulty line phase, for instance in line phase III, and the plug 61 has been inserted into the socket 56 of said phase, then the current induced in the secondary winding of the respective current transformer 54 will divide itself, part flowing by way of the load resistor 55 and part by way of the harmonic current trap 58. Since the harmonic current trap 58 has in series with a resistor element 59 a condenser 60 which constitutes a high impedance to the flow of the low-frequency line currents, only the high frequency harmonic currents to which the series condenser 60 offers little impedance will flow through said resistor 59, the low frequency current taking the path through the load resistor 55. A fraction of the harmonic currents flowing through the trap resistor 59 are trapped off to a transformer 63 through which the same are supplied to the exciting circuit 52 of the indicating device 51.

In order to supply the harmonic voltage components to the exciting circuit 52 of the ground-indicating device, we provide a suitable resonance circuit 66 which may be connected by means of the three-arm switch shown between any one of the line phases and the other two line phases, as in the arrangement shown in Fig. 1, tapping resistor 68 being connected across a portion of the resonance circuit 66 for diverting a fraction of the voltage harmonics flowing in the circuit into the exciting circuit 52 of the indicating device. The exciting circuit 52 is completed by a double pole change-over switch arranged to establish a path through which the current harmonics induced by the transformer 63 and the currents tapped off from the resistor 69 may act either additively or subtractively. The double pole change-over switch 69 also permits the disconnection of the indicating device 51 from the circuit which supplies the harmonic voltage component, while a switch 70 serves to disconnect said device from the circuit that supplies the current harmonics.

The arrangement shown in Fig. 2 operates similarly to that of Fig. 1. Assuming, for instance, that the fault occurred in the line phase III, and, after determining that said phase has a fault thereon, the several switches are brought into the positions shown in the drawing. The several circuit constants and the tapping resistors of the circuits are so adjusted that the harmonic voltage components and harmonic current components supplied to the exciting circuit 52 through the transformer 63 and through the tapping resistor 68, are of approximately the same intensity while being either in phase or 180° out of phase with respect to each other. In general, it is not necessary that the phase difference shall be zero or 180°, except that the phase difference shall be other than 90°. However, a phase difference of zero or 180° is preferable, as it produces the maximum variations of the sound and gives the best indications.

Under such conditions, the sound in the telephone 51, or, in general, the indications of the ground-detecting device, will be very markedly affected by the position of the change-over switch 69, being a maximum if the switch is in a position where the voltage and current components act in the same direction, while being a minimum if said components are in opposition. Accordingly, with the change-over switch 69 placed in a predetermined position, for instance to the right, the intensity of the indication produced in the fault-detecting device 51 will be a maximum if the harmonic currents flow in one direction, and a minimum if said currents flow in the opposite direction, producing thus an indication of the direction in which the line fault is to be found. It is also possible to suitably calibrate the positions of the change-over switch 69 so as to indicate the existence of the fault on one side of the line if the maximum sound is produced with the switch in one position, and the existence of the fault on the other side of the line if the maximum sound is produced with the switch in the other position.

The ground-indicating devices described hereinabove may be arranged to be operated either by harmonic components of one particular frequency only, or by the aggregate of a larger or smaller proportion of the higher harmonics in the line. Various other arrangements than those shown and described above may be used for securing indications or effects corresponding to the combined actions of the current and voltage harmonics, and if necessary weak harmonics that would otherwise be insufficient to directly produce the desired indications may be amplified by including suitable amplifying devices in the operating circuits of the indicating devices.

While we have described the invention as applied specifically to a sound-producing device for giving a sound indication of the existence of a fault, it is clear that the indicating device may also be utilized as relays for controlling suitable protective apparatus associated with a transmission line system, and we desire that the appended claims be construed broadly to cover the application of the novel principles of the invention either to indicating devices per se, or to relays, or other auxiliary apparatus associated with such systems.

What we claim is:

1. The combination with an alternating-current transmission line having two line phases operating at relatively low frequencies and having a grounding choke coil connected to a neutral point between said line phases, of a device for ascertaining a ground on one of said lines; said device comprising means for deriving a harmonic current component of a particular frequency corresponding to the intensity of the harmonic currents flowing in the faulty line phase, and means for deriving a harmonic current component of the same frequency corresponding to the harmonic voltages between said faulty line phase and the other line phase, said means being arranged to cause the phase angle between said harmonic current components to be different than 90°, and means for actuating said device in response to the additive or subtractive effect of said harmonic current components.

2. In an electrical polyphase system of the character described having a plurality of phase lines, a tuned circuit, means operable to provide for selective operative association between said circuit and any one of said lines and the other of said lines, a second tuned circuit, means operable to provide for selective operative association between said second tuned circuit and the individual lines, and indicating means common with respect to said circuits and responsive to the current conditions in each and being operable to provide an indicating action proportional in degree to the joint influence of such conditions.

In testimony whereof we have hereunto subscribed our names at Zurich, (Switzerland) on this 18 day of November, A. D. 1926.

JAKOB KOPELIOWITSCH.
JOSEF STOECKLIN.